(No Model.)
J. W. COLE.
BICYCLE SUPPORT.
No. 581,337. Patented Apr. 27, 1897.
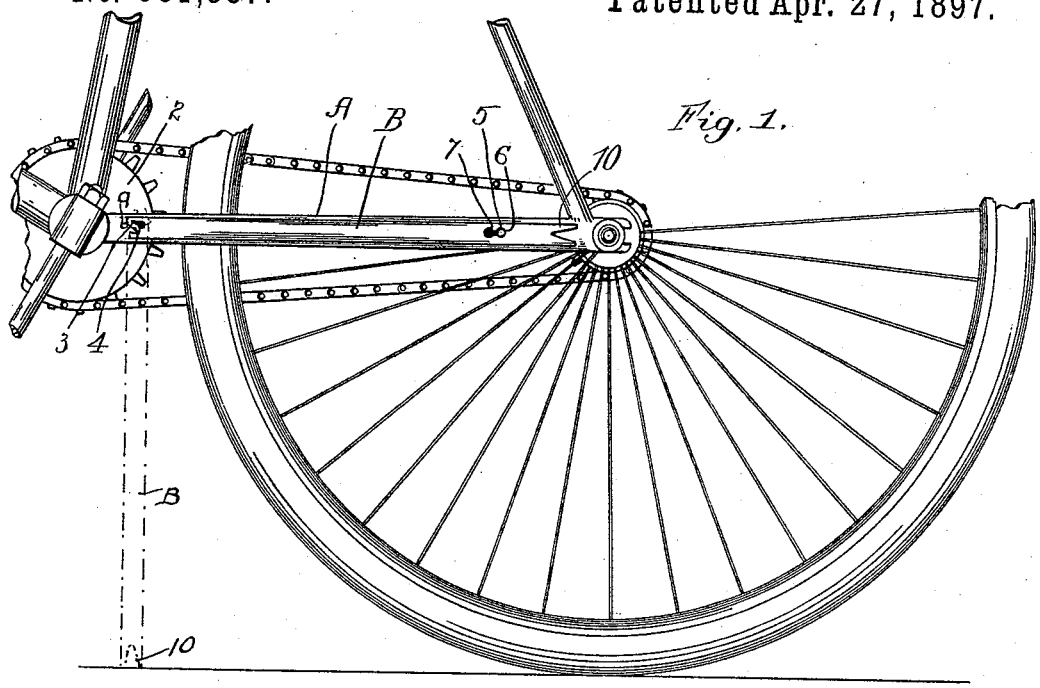
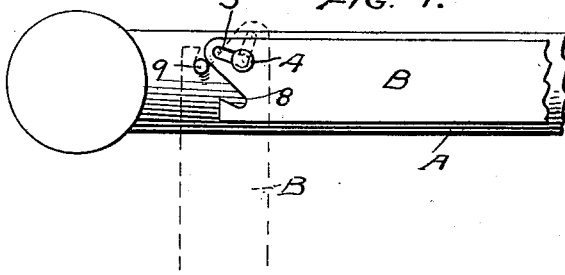 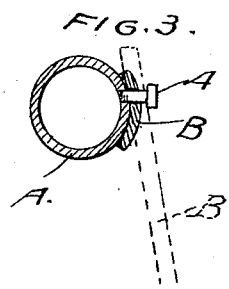
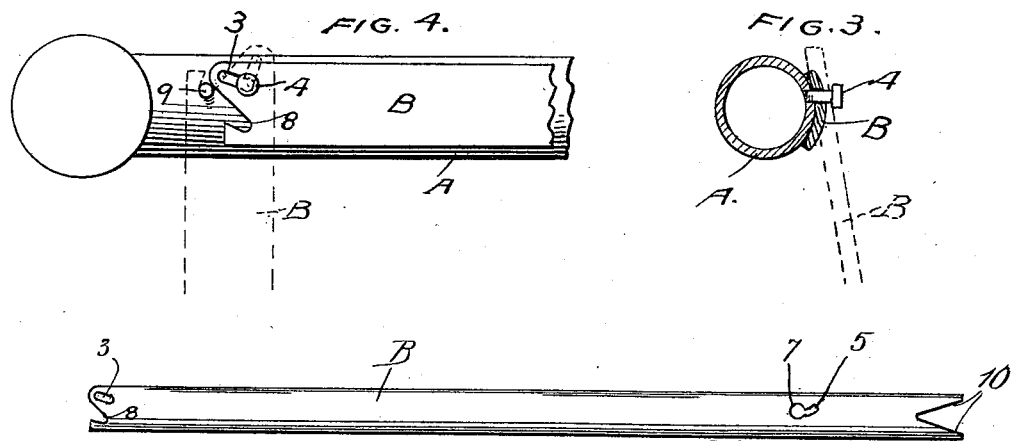
Witnesses:
Inventor:
James W. Cole.
per: _____
Attorney.

UNITED STATES PATENT OFFICE.

JAMES W. COLE, OF ST. PAUL, MINNESOTA, ASSIGNOR OF ONE-HALF TO WILLIAM L. WINANS, OF SAME PLACE.

BICYCLE-SUPPORT.

SPECIFICATION forming part of Letters Patent No. 581,337, dated April 27, 1897.

Application filed July 1, 1896. Serial No. 597,763. (No model.)

*To all whom it may concern:*

Be it known that I, JAMES W. COLE, of St. Paul, Ramsey county, Minnesota, have invented certain Improvements in Bicycle-Supports, of which the following is a specification.

My invention relates to improvements in bicycle-supports, its object being to provide an attachment for the ordinary bicycle which can be downturned to bear against the ground and hold the bicycle in upright position.

My invention further consists in the specific construction hereinafter more particularly described and claimed.

In the accompanying drawings, forming part of this specification, Figure 1 is a partial side elevation of a bicycle, showing my invention applied thereto. Fig. 2 is a side view of my improved supporting-bar. Fig. 3 is a cross-section taken through the horizontal stay of the bicycle, illustrating the connection of my improved supporting-bar thereto; and Fig. 4 is a partial side view of the stay, showing the support in raised and lowered position in full and dotted lines, respectively.

In the drawings, A represents one of the horizontal stays of a bicycle-frame.

B represents my improved supporting-bar hinged to the tubing A near the sprocket 2. The pivoted end of the supporting-bar is formed with a slot 3, through which the pivot-pin 4, securing it to the bicycle-tubing, is passed. The free end of the bar B is also formed with a curved slot 5, so that the bar may be hooked over the stud 6 upon the frame to secure it in raised position, as shown in Fig. 1, one end of the slot 5 being formed with an enlarged portion 7 to receive the stud. The bar B is preferably shaped to fit the curvature of the tubing A.

In order to prevent the bar B from swinging upon the pivot-pin 4 when downturned to bear upon the ground, I form the pivoted end of the bar with a notch 8, adapted to receive the stud 9 upon the tubing when the bar is downturned into the dotted-line position shown in Fig. 1.

In use the supporting-bar is normally held in the full-line position shown in Fig. 1 with its free end hooked over the stud 6. When it is desired to downturn it into the dotted-line position, it is moved toward the rear of the machine to bring the stud 6 to the enlarged portion of the slot 5, when it can be unhooked from the stud and downturned with its pointed end 10 bearing against the ground. The machine then being slightly tilted to rest upon the support will cause the pivot-pin 4 to be forced to the bottom of the slot 3 and the stud 9 to enter the notch 8, as shown by dotted lines in Fig. 1, the bar thus being prevented from turning while remaining in such position.

The pivot-pin 4 preferably projects a slight distance from the tubing, so as to give slight play and allow the bar to be turned to bear upon the ground a slight distance away from the side of the machine, thus holding it in tilted position. It thus is only necessary to use one supporting-bar, since the machine being held in a slightly-tilted position will not fall in the opposite direction.

I claim—

1. In combination with the horizontal stay of a bicycle, the supporting-bar having a pivotal connection therewith, consisting of a pin upon the stay, projecting through a slot in the bar, the free end of said bar being formed with a curved slot, adapted to be hooked over a stud upon the stay, to hold the bar in raised position.

2. In combination with the horizontal stay of a bicycle, the supporting-bar having pivotal connection therewith, the means for holding the bar in raised position, consisting of a stud upon the stay adapted to project through a slot in the free end of the bar, and the means for preventing swinging of the bar when downturned, consisting of a stud upon the stay adapted to interlock with the notch in the bar.

In testimony whereof I affix my signature in presence of two witnesses.

JAMES W. COLE.

Witnesses:
T. D. MERWIN,
H. S. JOHNSON.